United States Patent [19]

Rössler

[11] Patent Number: 4,773,602

[45] Date of Patent: Sep. 27, 1988

[54] COMMINUTING DEVICE

[76] Inventor: Kurt Rössler, Blankenburgerstr. 21a, 4550 Bramsche 1, Fed. Rep. of Germany

[21] Appl. No.: 34,301

[22] Filed: Apr. 3, 1987

[30] Foreign Application Priority Data

Apr. 8, 1986 [DE] Fed. Rep. of Germany ....... 3611691

[51] Int. Cl.$^4$ .............................................. B02C 18/12
[52] U.S. Cl. ................................ 241/152 A; 241/161; 241/257 R; 241/261.1; 241/92
[58] Field of Search .................... 241/46 B, 46.11, 98, 241/86, 92, 100.5, 152 R, 152 A, 157, 225, 277, 282.1, 161, 257 R, 261.1

[56] References Cited

U.S. PATENT DOCUMENTS

| | | | | |
|---|---|---|---|---|
| 3,160,352 | 12/1964 | Mollring | ............................... | 241/98 |
| 4,171,103 | 10/1979 | Rössler | ........................... | 241/152 A |
| 4,387,858 | 6/1983 | Rössler | ........................... | 241/152 A |
| 4,493,459 | 1/1985 | Burkett | ............................ | 241/152 A |

FOREIGN PATENT DOCUMENTS 0910189 3/1982 U.S.S.R. ........................ 241/152 A

Primary Examiner—Timothy V. Eley
Attorney, Agent, or Firm—Jordan and Hamburg

[57] ABSTRACT

A comminuting device for commercial or industrial waste in the form of paper, plastics and the like comprising a downward feeding hopper, having a rotary cutting mechanism associated with a bottom discharge opening and a crushing and conveying tool above and rotating with the rotor has the discharge opening aligned substantially vertically to pass centrally or chordwise through the lower region of the hopper and the rotor is equipped at its circumferential face with knives disposed one above the other to travel through a substantially cylindrical cutting area traversing the discharge opening.

18 Claims, 6 Drawing Sheets

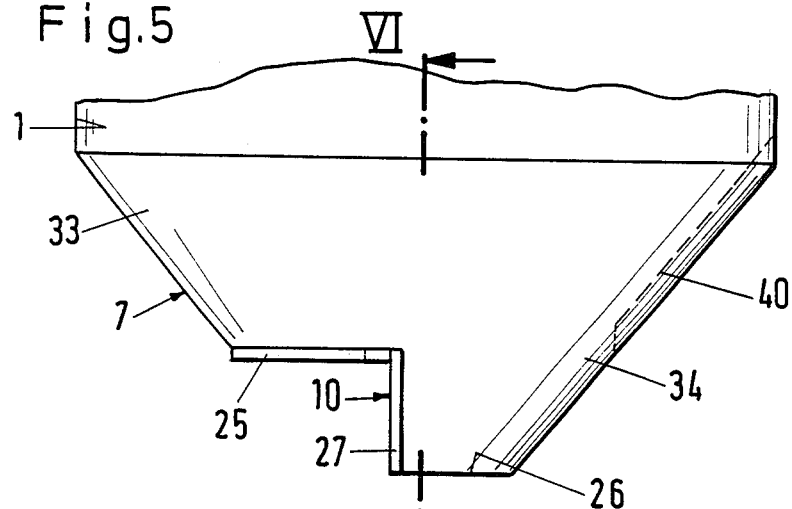
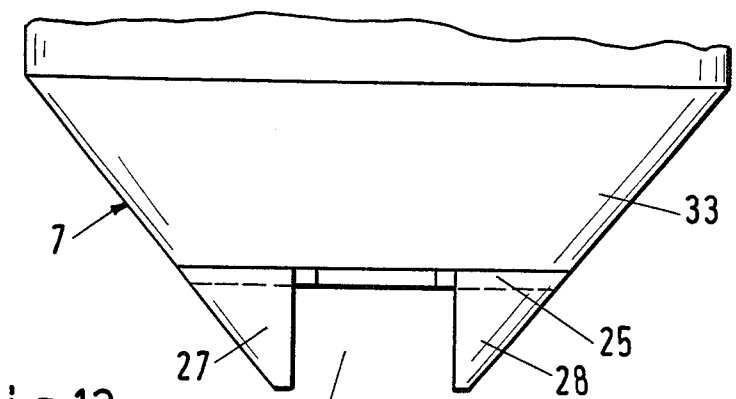
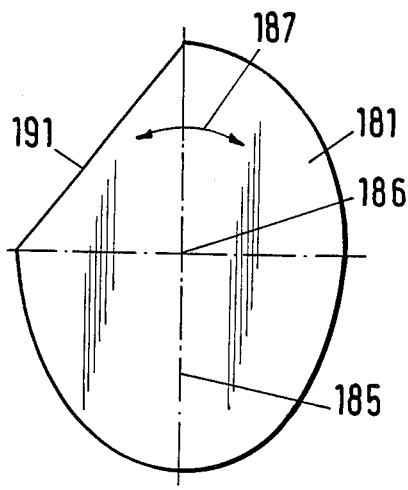
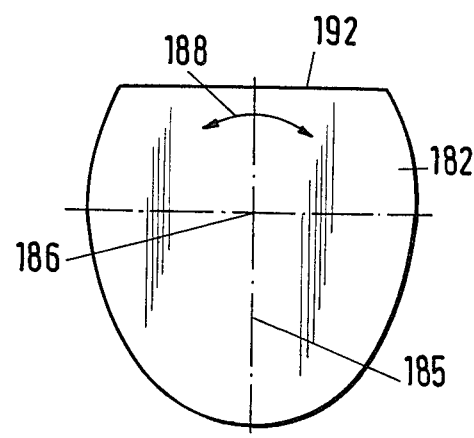

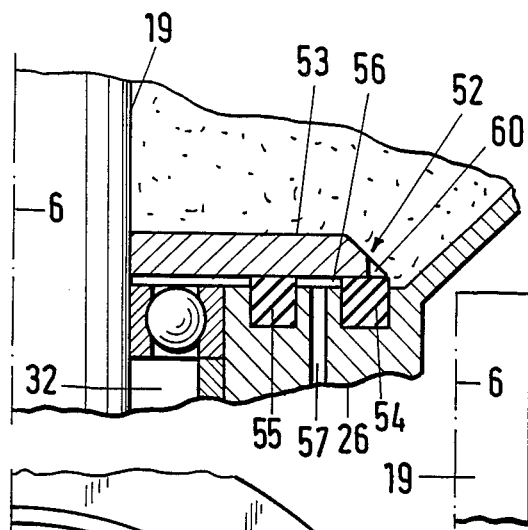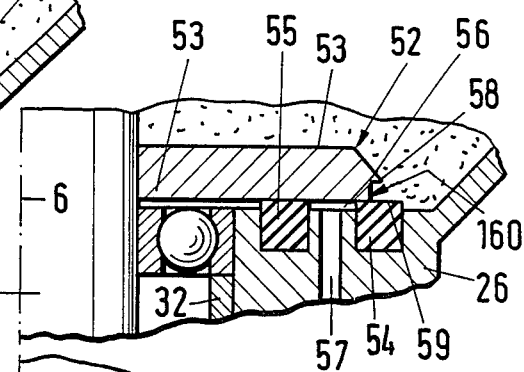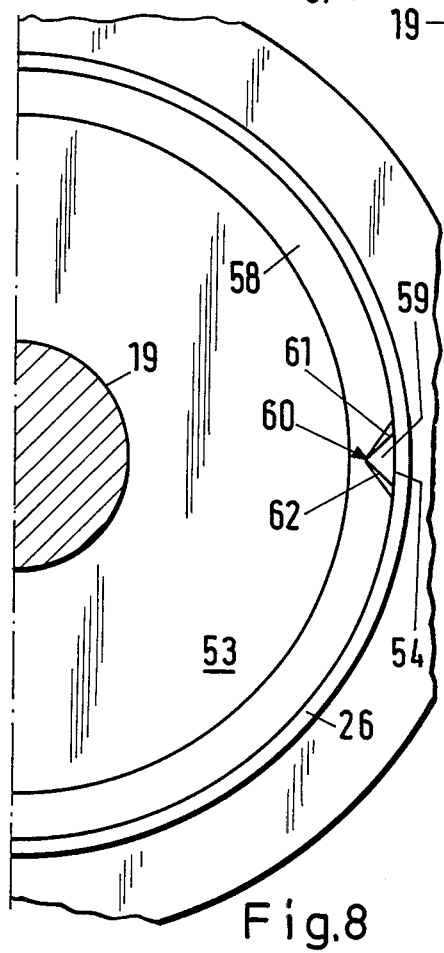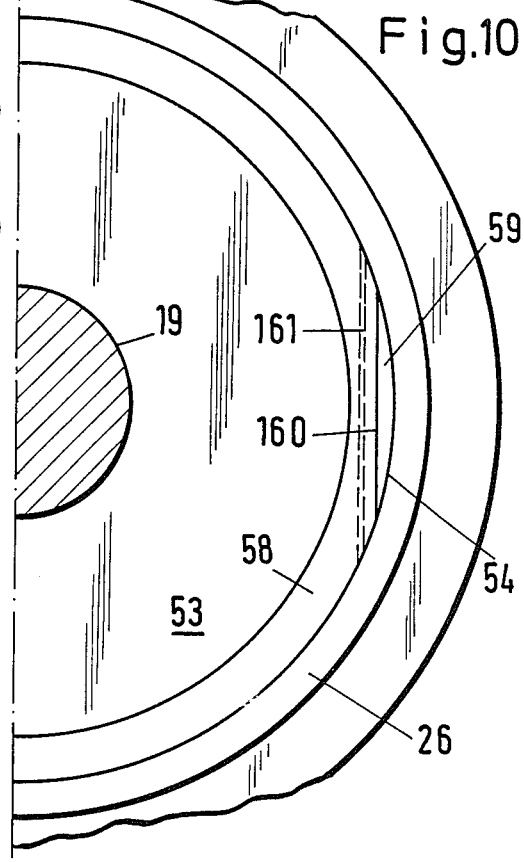

COMMINUTING DEVICE

BACKGROUND OF THE INVENTION

The invention relates to a comminuting device for commercial or industrial waste and concerns such a device having a receiving container with a vertical main axis for the material to be communited, which container changes over, at least in its lower region, into a hopper which has substantially the shape of a circular cone in its main portion and which, in its lower region, defines a discharge opening, having a cutting mechanism which is associated with the discharge opening and comprises a rotor which can be set in rotation about a vertical axis of rotation by means of a drive motor and has cutting knives the cutting edges of which, on rotation of the rotor, pass through an at least approximately closed cutting action area sweeping over the discharge opening, and having a crushing and conveying tool which rotates with the rotor, above this, and is effective in the hopper space above the discharge opening.

Known comminuting devices of this type serve for the dry comminution of objects in the form of solid pieces, particularly of wood. The hopper in the form of a circular cone, or sometimes in the form of a truncated pyramid, has a horizontal discharge opening at its lower end and the cutting knives of the rotor, which forms a slow-speed rotor, pass through an annular, substantially horizontal cutting action area (DE-PS No. 27 01 897; DE-PS No. 29 28 471).

For the communication of waste consisting of cardboard, paper, plastics or the like materials, such as accumulate primarily in the case of packaging waste, comminuting devices are used which generally comprise a hopper with a prismatic basic shape, the discharge opening of which is aligned substantially horizontally and is equipped with a cutting mechanism which comprises a rotor rotating horizontally as a high-speed rotor and equipped with cutting knives, or a pair of such rotors. Cutting appliances of such a construction (DE-OS NO. 19 15 559) certainly have a comparatively high comminuting capacity, generally exceeding the waste, but if they are too heavily loaded, particularly with flat material to be communited, they tend to seize. With light loading and voluminous material to be comminuted, the rotor tends to exert a repelling action because of its high speed of rotation and this also applies to double rotors.

SUMMARY OF THE INVENTION

It is the object of the invention to provide a comminuting device, particularly for packaging waste of cardboard, paper, plastics or the like materials, which ensures a positive, ordered feed of material to be comminuted to the cutting mechanism and at the same time a reliable comminution which can be quantitatively regulated, largely independently of the degree to which the receiving container is filled with material to be comminuted.

For this purpose, the comminuting device according to the invention, starting from a comminuting device of the type described above is improved in that the discharge opening is aligned substantially vertically and passes centrally or in the form of a chord through the lower region of the hopper and in that the rotor is equipped, at its circumferential face, with knives disposed one above the other, which travel through a substantially cylindrical cutting action area traversing the discharge opening.

The construction of the device according to the invention provides a forced conveying for the material to be comminuted in the hopper on the way to the cutting action area, which ensures a reliable feed of material to the cutting mechanism independently of the column of material in the receiving container. The cutting mechanism works free of the immediate effect of the material being comminuted on the cutting force so that both seizing phenomena in the event of heavy loading of the receiving container and repelling phenomena in the event of light loading are avoided. At the same time, the device is comparatively small in construction, processes even voluminous material to be comminuted without any problems and develops little noise as a result of the slow running of the rotor which is possible.

Numerous further features and advantages can be seen from the following detailed description given with reference to the drawings in which specific embodiments of the invention are illustrated diagrammatically by way of example.

BRIEF DESCRIPTION OF THE DRAWINGS

FIG. 3 shows a horizontal, broken-away, greatly enlarged section through the outer region of the rotor with cutting knife screwed on;

FIG. 5 shows a side view of the hopper region of a receiving container;

FIG. 6 shows a section on the line VI—VI in FIG. 5;

FIG. 7 shows a broken-away vertical partial section to illustrate the bearing seal of the rotor driving shaft in detail;

FIG. 8 shows a broken-away plan view of FIG. 7;

FIG. 9 shows a sectional illustration similar to FIG. 7 to illustrate a modified embodiment of the bearing seal;

FIG. 10 shows a broken-away plan view of FIG. 8;

FIGS. 13 to 16 show plan views of various embodiments of the plate member of the crushing and conveying tool.

DESCRIPTION OF THE PREFERRED EMBODIMENTS

Figure 1:
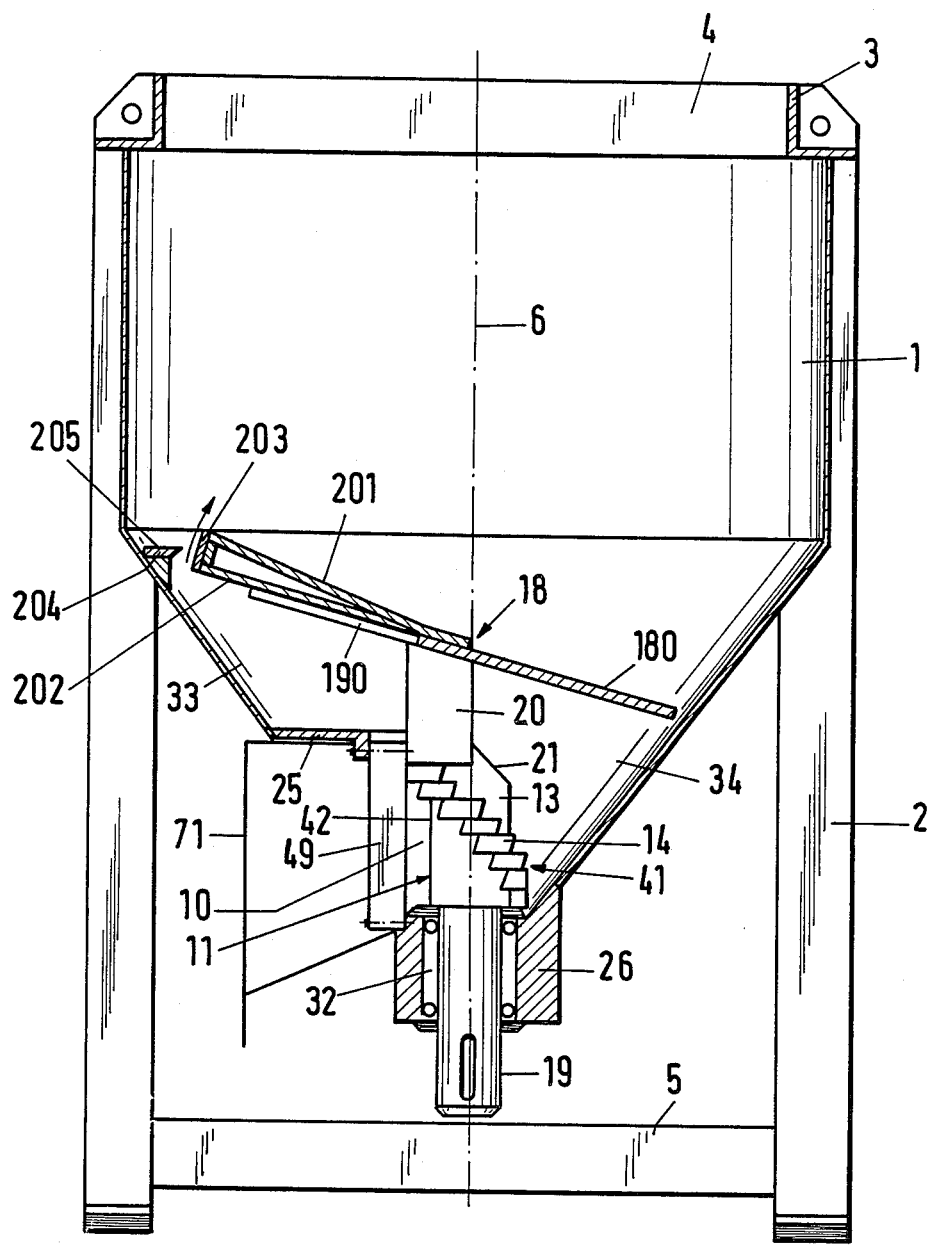
FIG. 1 shows a diagrammatic illustration of a comminuting device according to the invention in a vertical section through the main axis of the container, on the line I—I in FIG. 2.

The comminucating device, illustrated in the drawings, for commercial or industrial waste, particularly of cardboard, paper, plastics or the like materials, which can also be used to a limited extent for other materials, for example objects in the form of solid pieces, comprises, in detail, a receiving container 1 which is supported on the ground through vertical support legs 2. The support legs 2 form a framework with upper connecting struts 3, which define a filling opening 4 which an be closed by means of a cover, and with lower connecting struts 5.

The receiving container 1 has a vertical main axis 6 and changes over, in its lower region, into a hopper 7 which forms a substantially circular cone in its main portion.

In its lower region, the hopper 7 has a discharge opening 10 with which there is associated a cutting mechanism, designated as a whole by 11. This comprises a rotor 13, which can be set in rotation by means of a drive motor 12, about a vertical axis of rotation coinciding with the main axis 6 of the container and which has cutting knives 14, the cutting edges 15, 16 of which, on rotation of the rotor, pass through a substantially closed cutting action area 17 which sweeps over the discharge opening 10 and has a form which is at least substantially cylindrical.

Provided above the rotor 13, which can be driven by means of a rotor driving shaft 19, is a crushing and conveying tool 18 which rotates with the rotor and is effective in the interior of the hopper 7 above the discharge opening 10 and which is secured to the upper end of an upper extension 20 of the rotor 13 in the form of a half-shaft.

The crushing and conveying tool 18, the more detailed construction of which will be gone into later, has the purpose of precomminuting material to be comminuted such as cardboard boxes, etc. to prevent bridges from forming in the interior of the container and, apart from a tearing and crushing function, in particular to exert a conveying action in the downward direction on the material being comminuted.

In the embodiment illustrated, the discharge opening 10 of the hopper 7 of the receiving container 1 is aligned vertically downwards, its area extending with spacing from the main axis 6 of the container. Instead of the preferred vertical alignment, however, the discharge opening 10 may also be inclined slightly in relation to the vertical. Furthermore, instead of being chord-shaped with spacing from the main axis 6 of the container, the discharge opening 10 may also pass centrally through the lower region of the hopper 7.

The hopper 7 has an upper wall portion 25 which projects substantially horizontally towards the main axis 6 of the container and bounds the discharge opening 10 at the top and a lower wall portion 26 which projects horizontally towards the main axis 6 of the container in a component region of its cross-section, and bounds the discharge opening 10 at the bottom and which, like the wall portion 25, is formed from a separate added member. Adjacent to the inner marginal edge of the upper wall portion 25 are connecting wall portions 27, 28 which extend downwards and bound the discharge opening 10 laterally.

As can be seen from FIG. 1, the rotor driving shaft 19 is mounted and supported, overhung, only in the lower wall portion 26, through a bearing 32.

The funnel-shaped wall of the hopper 7 comprises two sectors 33, 34, the circular conical portion of which is formed by a common generatrix. Associated with the sector 33 of the hopper 7 is the upper wall portion 25 and this sector 33 has its upper limiting value with a sector angle of 180° when viewed from the top of the hopper 7. The lower limiting value may theoretically, be considerably lower, for example a sector angle of 120° but as a result, the dimensions of the discharge opening 10 are reduced to an extend which is generally unwanted. Accordingly, the other sector 34 has a sector angle of 180° as a lower limiting value.

As can be seen from FIGS. 5 and 6 respectively, a rail 40 is provided in the sector 34 and extends along a generatrix, is welded to the hopper wall, may have the shape of an inverted U in cross-section and preferably ends substantially at the height of the wall portion 25.

Figure 3:
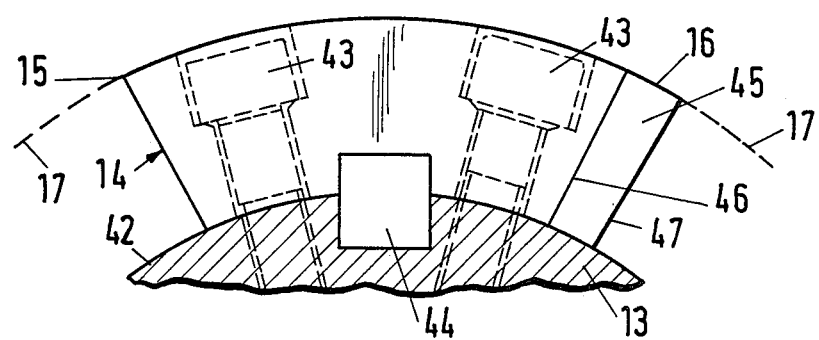

The cutting knives 14, as can be seen in particular from FIG. 3, have a basic shape in the form of a segment of a ring and are preferably combined in groups 41. Within their group 41, they have a staggered arrangement along a helix and with the preferred number of two groups 41 of knives arranged diametrically on the rotor 13, the helices preferably have an opposite pitch so that the rotor 13 fulfils the same cutting work conditions in both directions of rotation.

The cutting edges 15, 16 of the cutting knives 14 preferably all extend in a cylindrical area which is coaxial with the axis of rotation of the rotor 13 and forms the cutting action area 17 and which surrounds the circumferential surface 42 of the rotor 13 with spacing. They are located on their rotor 13 by screws 43 and additionally secured by a key 44. The front faces of the cutting knives 14 may be aligned parallel to the axis of rotation in which case the front faces may appropriately be set at a clearance angle. Instead of this, the front faces 45 may also form a small acute angle with a generatrix of the cutting action area 17, as can be seen in FIG. 3, in which case, either the upper boundary edge 46 or the lower boundary edge 47 may be arranged leading in the direction of rotation. This depends on whether the cuttng knives 14 are fitted to a rotor 13 of cylindrical shape with an upper inclined portion 21 or to a rotor which has the basic shape of a truncated circular cone.

Figure 4:
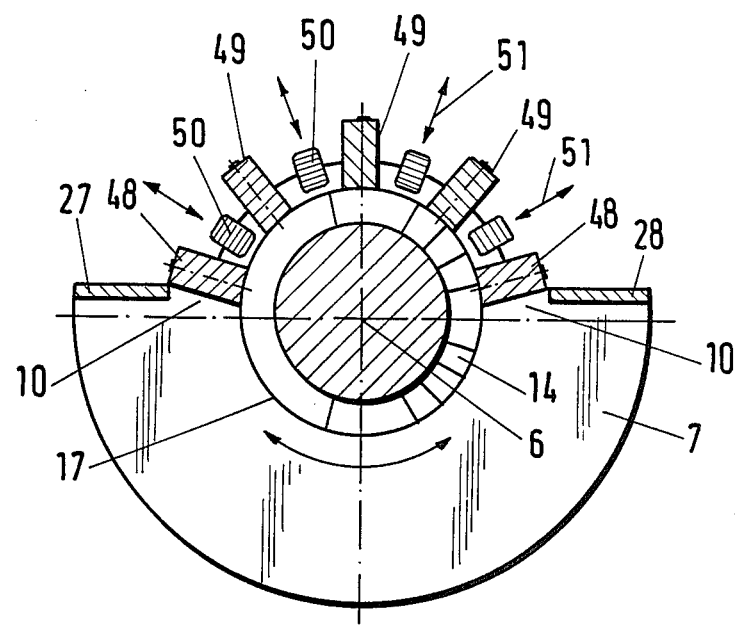
FIG. 4 shows a diagrammatic horizontal section through the device at the height of the cutting mechanism.

Associated with the rotor 13 in the region of each of the lateral edges of the discharge opening 10 is a strip-shaped upright knife 48 (FIG. 4), parallel to the axis of rotation. These upright knives 48, which reach practically as far as the cutting action area 17 can be regarded as the actual lateral boundary of the discharge opening 10. Furthermore, a further, central upright knife 49 may be associated with the rotor 13 at the side remote from the hopper compartment, or three upright knives 49 may be provided arranged distributed as in the example shown in FIG. 4.

Furthermore, associated with the rotor 13, in the gaps between adjacent upright knives 48, 49, there may be screening bars 50 which are parallel to the axis of rotation and are supported at the hopper side and which, as indicated by the arrows 51, are held for parallel displacement and location in the radial direction. Their presence and their spacing from the cutting action area 17 of the rotor 13 can help to determine the size of the granules resulting during the comminuting operation.

As can be seen, in particular, from FIGS. 7 to 10, the bearing 32 in the wall portion 26 is sealed by a bearing seal 52 which is associated with the rotor drive shaft 19 above the bearing 32. This bearing seal 52 comprises a packing ring 53 which is mounted on the rotor driving shaft 19 and projects radially and which is in pressure engagement, at its side adjacent to the bearing 32, close to its outer edge, with a stationary axial slip-ring 54 of felt or the like material. The packing ring 53 may furthermore be in pressure engagement with a second stationary axial slip-ring 55 arranged concentrically inside the axial slip-ring 54 and a lubricant duct 57 may lead into the gap 56 between the underside of the packing ring 52 and the surface of the wall portion 26.

Provided in the chambered outer edge 58 of the packing ring 53 is a recess 60 or 160 which is arranged over an outer portion of the outer axial slip-ring 54 in the region of which it exposes the surface 59 of the axial slip-ring 54. The recess 60 is made in the form of an acute-angled notch and the recess 160 in the form of a chord-shaped excision. The boundary edges 61 and 62 of the recess 60, adjacent to the axial slip-ring 54, form an acute angle with the adjacent outer marginal edge of the packing ring 53 in each case and this also applies to the boundary edge 161 as can be seen from FIG. 10. The boundary faces of the recess 60 or 160 adjoining the boundary edges 61, 62 or 161 in the upward direction may form an angle with the underside of the packing ring 53 which is preferably smaller than 90°.

Such a bearing seal ensures, by extremely simple means, that fine particles, which inevitably get between the packing ring 53 and the outer axial slip-ring 54, on over-flowing the recess 60 or 160 pass upwards into the region of the boundary edges 61, 62 or 161 and are conveyed away outwards from these. Such a bearing seal therefore affords a long life with the simplest means. This applies in general to comminuting devices with bearing seals which have to seal against small objects or objects in the form of dust or small pieces.

Figure 12:
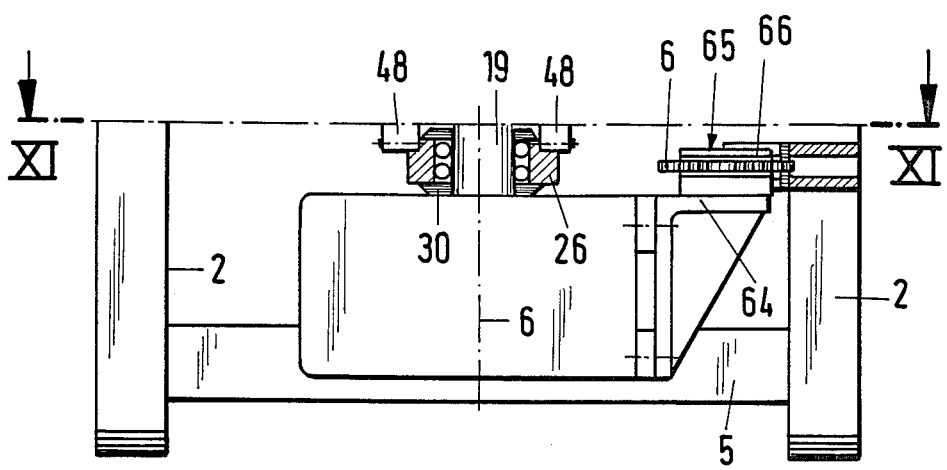
FIG. 12 shows a side view of FIG. 11, partially in section on the line XII—XII in FIG. 11.
Figure 11:
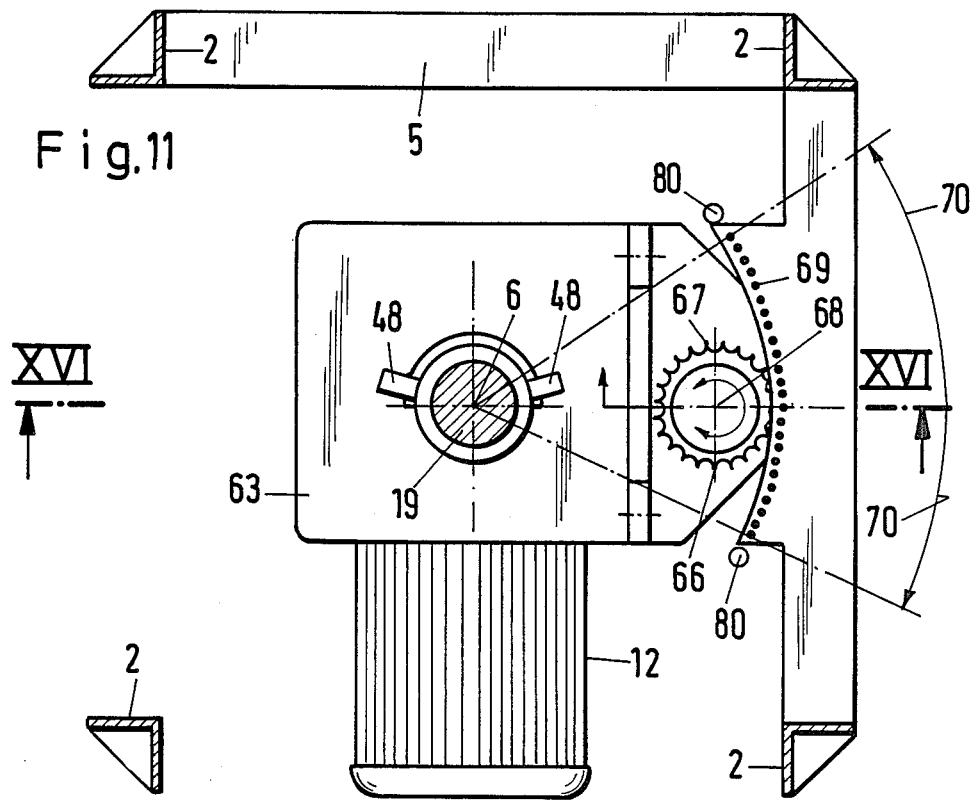
FIG. 11 shows a diagrammatic illustration of the drive region of the comminuting device in a horizontal, diagrammatic section on the line XI—XI in FIGS. 12 and 16.

As can be seen from FIGS. 11 and 12, the drive motor 12 is coupled to the rotor driving shaft 19 through a (bevel) gearbox 62. The gearbox 63 placed on the lower end of the rotor driving shaft 19 comprises a lever arm 64 which projects radially and on which a pinion 67, which is located by means of an adjustable friction brake device 65 with an upper and lower brake disc 66, is mounted for rotation about an axis of rotation 68 parallel to the rotor driving shaft 19. This pinion meshes with an arcuate rack 69 which is fixed at the container side, that is to say to the framework of the struts 2, 3, 5 and forms a particularly simple overload protection for the drive of the device if the rotor 13 should ever seize for any reason. Furthermore, limit switches 80, illustrated diagrammatically, are provided which, after pivoting of the gearbox 63 out of an initial position illustrated in FIG. 11, through a given angle 70 in both directions during its actuation, each cause a reversal of the direction of driving rotation of the drive motor 12.

When the device is in operation, material to be comminuted is seized by the crushing and conveying tool 18, pre-comminuted and conveyed in the direction of the discharge opening 10 in which the cutting knives 14 intercept the material to be comminuted and progressively comminute it in co-operation with the upright knives 48 and possibly 49.

The granulated material is discharged through a discharge chamber 71 and enters a collecting box, for example by means of a pneumatic conveyor, for further use. The upright knives 48, 49 can be fixed to the wall portions 25, 26 by attachment screws.

The cutting mechanism 11 can be driven in both directions of rotation by the drive motor 12 and affords uniform conditions for cutting work in both directions of rotation. The speed of rotation is adjusted, depending on the diameter of the cutting action area 17, so that the cutting speed is lower than 2 m/sec, preferably about 1.2 m/sec.

The crushing and conveyor tool 18 has the basic shape of a plate 180, 181, 182, 183 or 184 which is slightly inclined in relation to the horizontal, for example inclined at 5°-45°, and which has an elliptical contour and reaches close to the hopper wall at the end. The plate is plane and comparatively thin but forms a rigid tool member.

Figure 2:
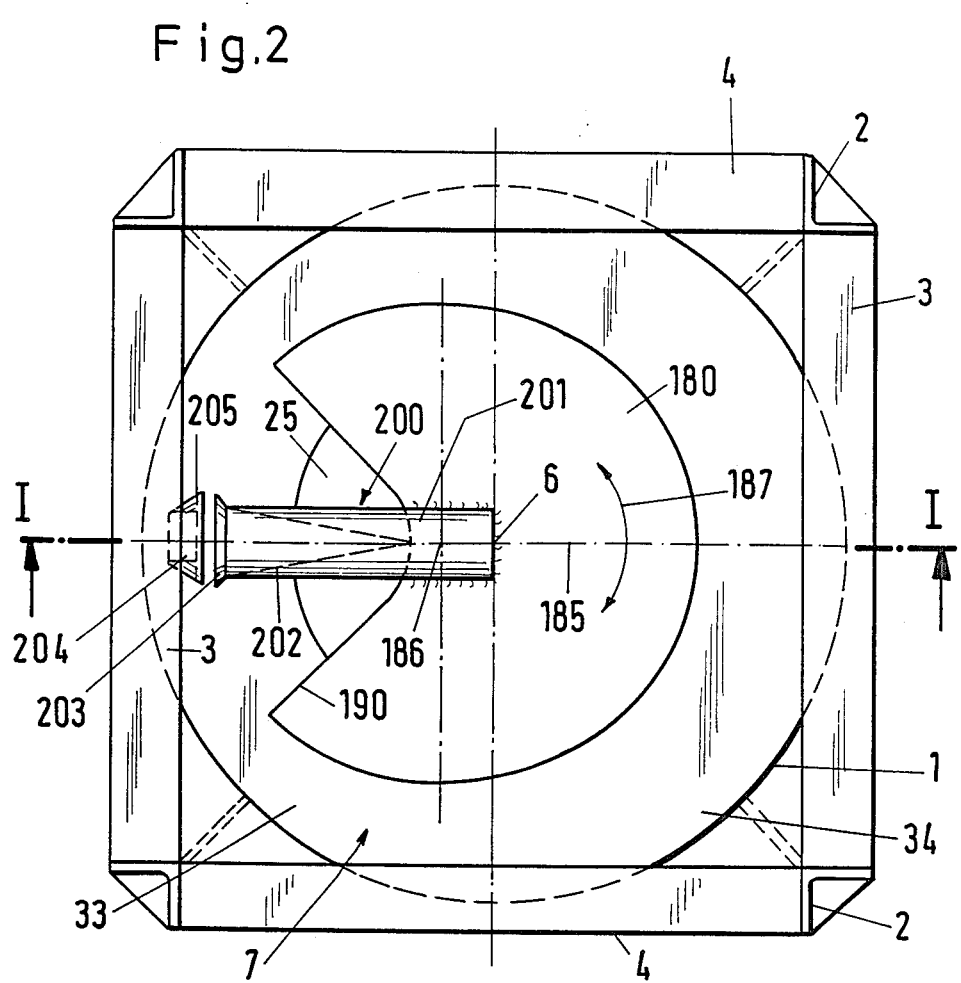
FIG. 2 shows a plan view of FIG. 1.

The plate 180 in FIGS. 1 and 2 comprises, in its higher situated half, a V-shaped recess 190 with an opening angle of approximately 90° and a rounded tip.

The plate 180, 181, 182, 183, 184 can be fixed to the rotor 13, centrally in relation to this, by means of the extension 20, but may also have an eccentric arrangement, as illustrated in FIGS. 1 and 2, wherein the main axis 6 of the container intersects the major axis 185 of the ellipse of the plate 180, 181, 182, 183, 184 at a distance from the centre of the plate 186. Depending on the requirements of the material to be comminuted which is predominantly processed, the elliptical shape of the forms of plate illustrated may either approach the circular shape to a greater extend or be slimmer in construction.

The plate 180 illustrated in FIGS. 1 and 2 has, in its higher situated half, in the region of its end coinciding with the major axis 185 of the ellipse, a recess 190 which extends symmetrically in relation to the major axis 185 of the ellipse and is substantially V-shaped and which has an opening angle of about 90° and a rounded tip. A plate with such a recess is equally suitable for action on material being comminuted in both directions of rotation 188. The crushing and conveying tool 18, in the embodiment shown in FIGS. 1 and 2 comprises, in addition to the plate 180 with recess 190, an arm 200 which extends along the major axis 185 of the ellipse and extends upwards, at a small angle, from the surface of the plate. The arm 200 is preferably made resiliently flexible to a limited extent upwards and downwards and may consist of a flat web 201 and a wedge-shaped guide member 202, which is prismatic in cross-section, at its underside. The arm 200 is preferably constructed in the form of a hollow sheet-metal welded structure and welded onto the top of the plate 180.

The arm 200 extends, from the point of intersection of the particular plate and the major axis 6 of the container, along the major axis 185 of the ellipse over that half of the plate which is provided with cuts, recesses or openings.

At its end, the arm 200 preferably carries an interchangeable double knife 203 and the hopper 7 is provided, on its inner wall, at the height of the double knife 203 of the arm 200, with at least one similarly shaped counter knife 205 which is interchangeably secured to a bracket 204. It is understood that the hopper 7 may be provided with a plurality of counterknives 205 distributed regularly or irregularly over the circumference.

The type of plate 181 in FIG. 13 is one which is adapted only for operation in the direction of rotation 187 and is provided primarily for use with paper as a material to be comminuted. In a quadrant leading in the direction of rotation 187, the plate 181 has a chord-shaped cut 191 which, in the example illustrated, extends from the points of intersection of the contour line with the axes of the ellipse.

FIG. 14 illustrates a type of plate suitable for operation in both directions of rotation 188, the plate 182 being provided with a cut 192 extending perpendicular to the major axis 185 of the ellipse in the region of one end.

Figure 15:
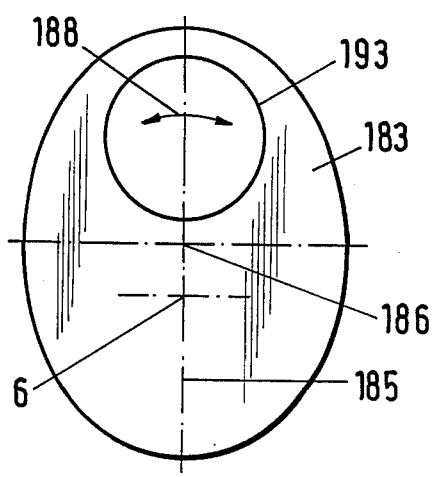
Figure 16:
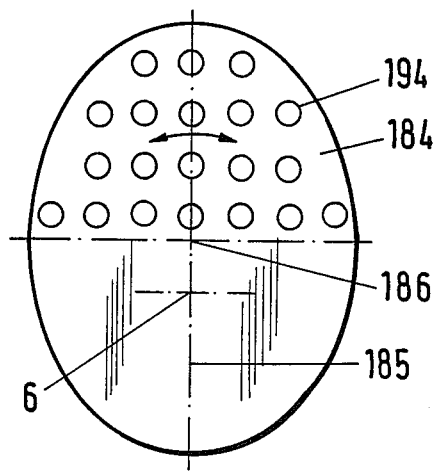

In the plate 183 shown in FIG. 15, instead of a recess open at the edge or a cut, an aperture 193 is provided in the region of one half of the plate and, like the recesses or cuts 190, 192 and 193 permits an exchange of material between the interior of the hopper 7 above and below the particular plate member. Instead of a single large aperture 193, the plate may also be provided with a plurality of apertures 194 as FIG. 16 illustrates for the plate 184. Plates 183, 184 with such apertures are provided, in particular, for more solid material of large format to be comminuted which is precomminuted already in the region above the plate member by the arm 200 and/or the knives 203, 205. The apertures 193 and 194 fulfil a certain screening or classifying function for such material to be comminuted.

It is understood that numerous other possible modifications for the formation of the plate are possible depending on the particular material mainly to be comminuted, such as the formation of a plate 181 with a cut 191 not only in the second but also in the first quadrant.

I claim:

1. A comminuting device for comminuting commercial or industrial waste material, comprising a receiving container having a generally vertical axis, said container having an upper portion for receiving the waste material to be comminuted and a lower portion formed at least partially with a conical configuration, said lower portion also having a discharge opening for discharging the comminuted waste material, a rotor means rotatably mounted in said container for rotation about a substantially vertical axis, cutter means driven by said rotor means and disposed juxtaposed to said discharge opening for comminuting the waste material and discharging the comminuted waste material out through said discharge opening, and breaking and conveying plate means rotatable with said rotor means within said conically configured lower portion of said container above said discharge opening, said breaking and conveying plate means being operable to precomminute said waste material and to exert a downward conveying action of the waste material being comminuted, said breaking and conveying plate means having an approximately elliptical configuration and being disposed at an acute angle relative to the vertical axis of said rotor.

2. A comminuting device according to claim 1 wherein said acute angle is in the range of from 5 to 45 degrees.

3. A comminuting device according to claim 1 wherein said conically configured lower portion of said container has a conical wall, said elliptical plate means having major and minor elliptical axes, said elliptical plate means having opposite end portions at opposite ends of said major axis, said end portions being disposed in close proximity to said conical wall.

4. A comminuting device according to claim 3 wherein one of said end portions of said elliptical plate means has a generally V-shaped recess.

5. A comminuting device according to claim 3 wherein one of said end portions has an outer edge which extends perpendicular to said major axis.

6. A comminuting device according to claim 1 wherein said elliptical plate means has a major and a minor elliptical axis, the intersection of said major and minor axes defining the center of said elliptical plate means, said center being spaced from said axis of rotation of said rotor means.

7. A comminuting device according to claim 6 wherein said major and minor axes divide said elliptical plate means into quadrants, one of said quadrants having an outer edge defined by a chord-like cut line.

8. A comminuting device according to claim 6 wherein said minor axis divides said elliptical plate means into two halves, and aperture means in one of said two halves.

9. A comminuting device according to claim 8 wherein said aperture means comprises an aperture having an aperture center disposed on said major axis.

10. A comminuting device according to claim 8 wherein said aperture means comprises a plurality of apertures.

11. A comminuting device according to claim 1 wherein said elliptical plate means has major and minor elliptical axes, said elliptical plate means comprising a plate having an upper surface and an elongated arm means on said plate, said arm means having an elongate axis extending along said major axis, said arm means having an upper arm surface which is disposed at an acute angle relative to said upper surface of said plate.

12. A comminuting device according to claim 11 wherein said arm means is made to be upwardly and downwardly resiliently flexible.

13. A comminuting device according to claim 11 wherein said arm means comprises a flat web upper portion and a wedge-shaped lower portion.

14. A comminuting device according to claim 11 wherein said plate has a groove underlying said arm means.

15. A comminuting device according to claim 11 wherein said arm means has an outer end, and arm knife means on said outer end.

16. A comminuting device according to claim 15 further comprising container knife means on said conically configured lower portion of said container, said container knife means being disposed generally juxtaposed to the path of travel of said arm knife means as said elliptical plate means is rotated such that said arm knife means cooperate with said container knife means during rotation of said elliptical plate means to effect a cutting action on said waste material.

17. A comminuting device according to claim 1 wherein said conically configured lower portion of said container has a vertical cone axis which is coincident with said vertical axis of rotation of said rotor means, said vertical container axis also being coincident with said vertical axis of rotation of said rotor means.

18. A comminuting device according to claim 1 wherein said elliptical plate means is disposed above said cutter means.

* * * * *